(12) United States Patent
Olah et al.

(10) Patent No.: US 10,008,867 B2
(45) Date of Patent: *Jun. 26, 2018

(54) BATTERY CHARGER FOR ELECTRONIC DEVICES AND ELECTRONIC DEVICE USING THE SAME

(71) Applicant: Laslo Olah, Richardson, TX (US)

(72) Inventors: Laslo Olah, Richardson, TX (US); Grigorii Sokolovskii, St. Petersburg (RU)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/485,349

(22) Filed: Apr. 12, 2017

(65) Prior Publication Data

US 2017/0353043 A1    Dec. 7, 2017

Related U.S. Application Data

(63) Continuation-in-part of application No. 15/346,425, filed on Nov. 8, 2016, which is a continuation of
(Continued)

(51) Int. Cl.
*H04M 1/02* (2006.01)
*H02J 7/00* (2006.01)
(Continued)

(52) U.S. Cl.
CPC ............ *H02J 7/0027* (2013.01); *H02J 7/007* (2013.01); *H02J 7/0044* (2013.01);
(Continued)

(58) Field of Classification Search
CPC ....... H04W 4/02; H04W 64/00; H04W 80/00; H04W 4/025
(Continued)

(56) References Cited

U.S. PATENT DOCUMENTS

| 4,126,822 A | 11/1978 | Wahlstrom |
| 7,898,096 B1 | 3/2011 | Krupenkin |

(Continued)

FOREIGN PATENT DOCUMENTS

| CN | 203377111 | 1/2014 |
| WO | 2015/154050 | 10/2015 |

OTHER PUBLICATIONS

International Searching Authority, International Search Report, PCT/US2015/024376, dated Jul. 6, 2015.
(Continued)

*Primary Examiner* — Sam Bhattcharya
(74) *Attorney, Agent, or Firm* — Scott T. Griggs; Griggs Bergen LLP

(57) ABSTRACT

A battery charger for electronic devices and an electronic device are disclosed. In one embodiment, a battery charger housing forms a portion of an outer device shell or a protective case cover. Capacitors are located within the battery charger housing that include opposing spaced plates having contact segments thereon. An output power increasing, electrically resistive fluid is held within and partially fills an enclosed chamber that is boundaried by the contact segments. In response to movement of the electronic device, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge. An electronic circuit, which is coupled to the opposing spaced plates, is configured to transfer the electrical charge to a battery associated with the electronic device.

18 Claims, 3 Drawing Sheets

Related U.S. Application Data application No. 14/972,841, filed on Dec. 17, 2015, now Pat. No. 9,491,271, which is a continuation-in-part of application No. PCT/US2015/024376, filed on Apr. 3, 2015.

(60) Provisional application No. 61/995,159, filed on Apr. 3, 2014.

(51) Int. Cl.
*H04B 1/3816* (2015.01)
*H02N 1/04* (2006.01)

(52) U.S. Cl.
CPC ............ *H02J 7/0052* (2013.01); *H02N 1/04* (2013.01); *H04B 1/3816* (2013.01); *H04M 1/0262* (2013.01)

(58) Field of Classification Search
USPC ........... 455/550.1, 571–573, 575.1; 320/107, 320/108, 157
See application file for complete search history.

(56) References Cited

U.S. PATENT DOCUMENTS

| | | |
|---|---|---|
| 9,491,271 B2 | 11/2016 | Olah et al. |
| 2006/0077762 A1 | 4/2006 | Boland et al. |
| 2015/0207360 A1 | 7/2015 | Adams et al. |

OTHER PUBLICATIONS

International Searching Authority, International Search Report, PCT/US2016/059946, dated Jan. 12, 2017.

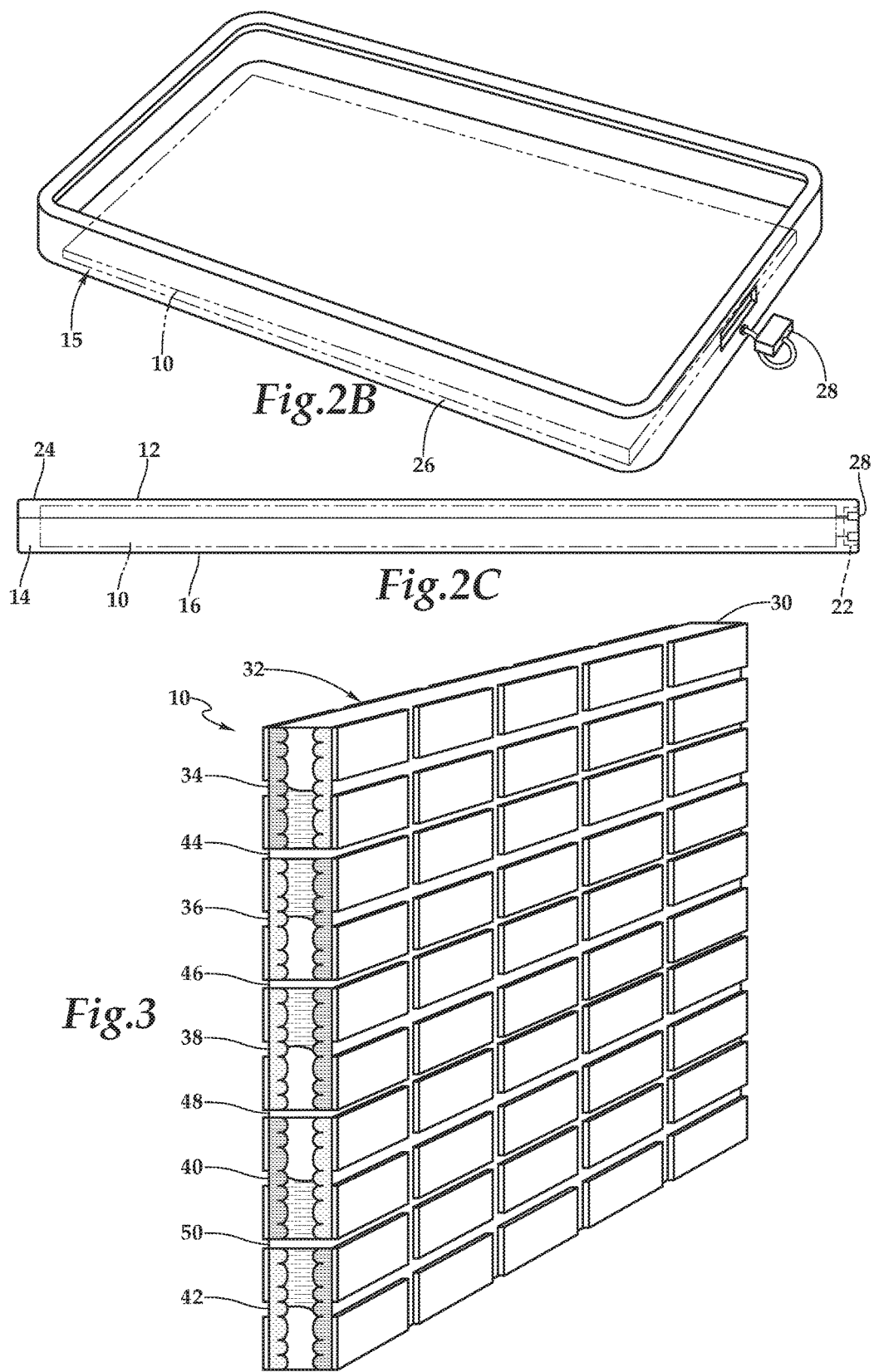

ND ELECTRONIC DEVICE
BATTERY CHARGER FOR ELECTRONIC DEVICES AND ELECTRONIC DEVICE USING THE SAME

PRIORITY STATEMENT AND CROSS-REFERENCES

This application is a continuation-in-part of U.S. patent application Ser. No. 15/346,425 which was filed on Nov. 8, 2016, in the names of Laslo Olah and Grigorii Sokolovskii; which is a continuation of U.S. patent application Ser. No. 14/972,841 which was filed on Dec. 17, 2015, in the names of Laslo Olah and Grigorii Sokolovskii and entitled "Battery Charger for Portable Electronic Devices and Portable Electronic Device Using the Same," which issued on Nov. 8, 2016 as U.S. Pat. No. 9,491,271; which is a continuation-in-part of application No. PCT/US2015/024376 which was filed on Apr. 3, 2015, in the names of Laslo Olah et al. and entitled "Battery Charger for Portable Electronic Devices and Portable Electronic Device Using the Same"; which claims priority from U.S. Patent Application Ser. No. 61/995,159 entitled "Battery Charger for Portable Electronic Devices" and filed on Apr. 3, 2014 in the name of Laslo Olah; all of which are hereby incorporated by reference, in entirety, for all purposes.

TECHNICAL FIELD OF THE INVENTION

This invention relates, in general, to battery chargers, and, more particularly, to battery chargers which generate an electrical charge which restores energy to the battery of an electronic device.

BACKGROUND OF THE INVENTION

All electronic devices that rely on a storage battery for operating power. Since the physical dimensions and weight of the electronic device must be limited to permit acceptable portability, the battery capacity is likewise severely limited. Accordingly, there is a need for improved systems and methods for providing improved battery capacity.

SUMMARY OF THE INVENTION

It would be advantageous to improve battery capacity in portable electronic devices. It would also be desirable to enable a mechanical-to-electrical conversion solution that would convert motion to electrical energy, which would thereafter be transferred to the battery of the electronic device. To better address one or more of these concerns, a battery charger for an electronic device and an electronic device using the same are disclosed. In one embodiment of the battery charger, a battery charger housing forms a portion of an electronic device protection member, such as an outer device shell of the electronic device or a protective case cover of a protective case such that the electronic device fits therein. Capacitors, which may be supercapacitors, are located within the housing and each of the pair of capacitors includes opposing spaced plates having contact segments thereon. An output power increasing, electrically resistive fluid is held within and partially fills an enclosed chamber that is boundaried by the contact segments. In response to movement of the electronic device, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge. An electronic circuit coupled to the opposing spaced plates is configured to transfer the electrical charge to a battery associated with the electronic device.

In another aspect, an electronic device includes an outer device shell, an interactive display interface mounted thereto, and a battery housed within the outer device shell. The aforementioned battery charger is located within the outer device shell. The kinetic motion of the electronic device causes the physical displacement of an output power increase, electrically resistive fluid relative to a pair of capacitors, thereby utilizing triboelectrical generation to create a charge stored in an electrical accumulator, which is connected to the battery.

In yet another aspect, a protective case for an electronic device includes a protective case cover and power connection member configured to couple to a power connector of the electronic device. The aforementioned battery charger is located within the protective case cover. The kinetic motion of the electronic device causes the physical displacement of an output power increase, electrically resistive fluid relative to a pair of capacitors, thereby utilizing triboelectrical generation to create a charge stored in an electrical accumulator, which is connected to the battery by way of the power connection member and power connection. In a further aspect, the aforementioned output power increase, electrically resistive fluid may alternatively be an output power increase, electrically resistive object. In yet a further aspect, the electronic device may be a portable electronic device such as a smart phone, tablet computer, smart watch or cellular telephone. The electronic device may be a hand control device such as a mouse, digital video game, or any other hand-held interactive device that is powered by battery and—by its movement—capable of converting kinetic motion into electrical power. The electronic device may be a moveable device, large or small. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2B is a side elevation view of the protective case employing the battery charger depicted in FIG. 2A;

FIG. 2C is a front perspective view of one embodiment of the protective case depicted in FIG. 2A;

FIG. 3 is a schematic perspective diagram of one embodiment of the battery charger depicted in FIGS. 1A and 1B;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
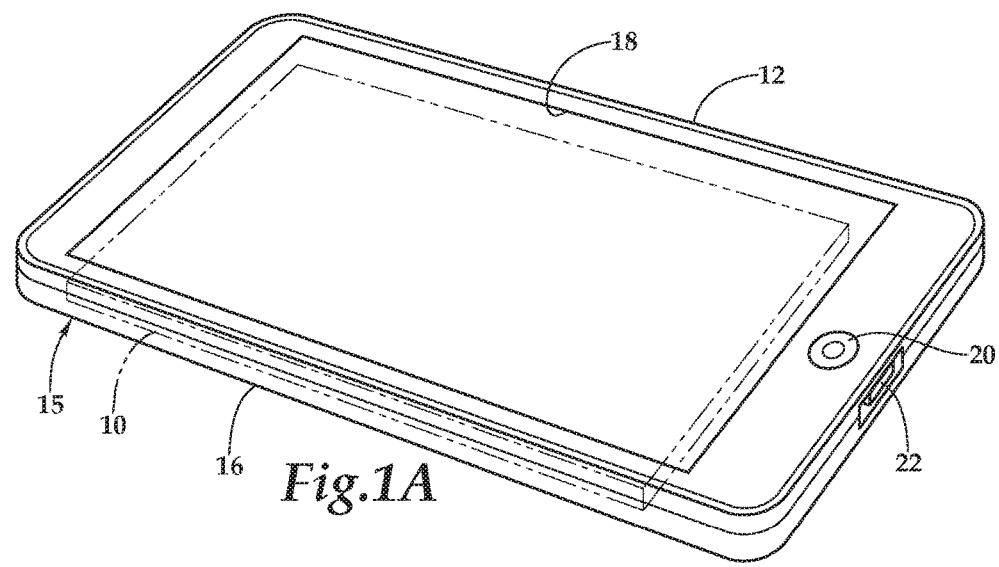
FIG. 1A is a front perspective view of one embodiment of an electronic device employing a battery charger according to the teachings presented herein.
Figure 1B:
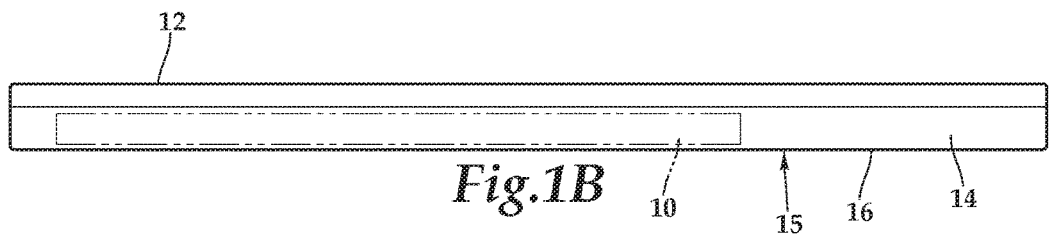
FIG. 1B is a side elevation view of the electronic device employing the battery charger depicted in FIG. 1A.

Referring initially to FIGS. 1A and 1B, therein is depicted one embodiment of battery charger, which is schematically illustrated and designated 10. The battery charger 10 generates an electrical charge which restores energy to an electronic device 12, which is depicted as a smart phone, which has a battery 14. The smart phone application 12 also includes a protective member 15, shown as an outer device shell 16, interactive display interface 18, a user button 20, and a power connector 22. As shown, the battery charger 10 forms a portion of the outer device shell 16 and, in one embodiment, may be integral therewith or therein. The battery charger 10 is located in electrical communication with the electronic device, the battery charger. It should be appreciated that although a smart phone is depicted, the electronic device 12 may be a smart phone, smart watch, tablet computer, or cellular telephone, or other electronic device such as a mouse, digital video game, or any other hand-held interactive device that is powered by battery and—by its movement—capable of converting kinetic motion into electrical power. The electronic device may be a moveable device, large or small. It should be appreciated that the portable electronic device, hand controlled device, and moveable device are non-limiting examples of an electronic device.

Figure 2A:
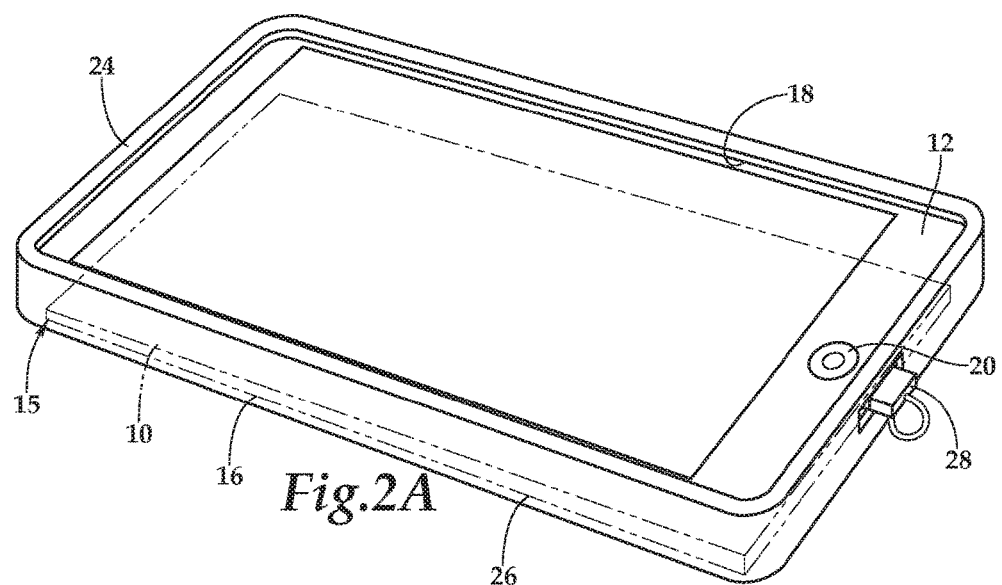
FIG. 2A is a front perspective view of one embodiment of the electronic device having a protective case employing a battery charger according to the teachings presented herein.

With reference to FIGS. 2A and 2B, in one embodiment, the battery charger 10 forms a portion of the protective member 15, which is a protective case 24 securely holding the electronic device 12. The protective case 24 includes a protective case cover 26 and a power connection member 28 that electrically couples to the power connector 22. It should be understood that the battery charger 10 may form a portion of the electronic device 12 or a portion of protective member associated therewith, such as a protective case. In this manner, the battery charger 10 may be implemented in a factory-made embodiment or an after-market embodiment. It should be appreciated that the shape and form of the protective member will depend on the electronic device, which as mentioned, may be a smart phone, smart watch, tablet computer, or cellular telephone, or other electronic device, for example.

Referring now to FIG. 3, one embodiment of the battery charger 10 is depicted. A battery charger housing 30 forms a portion of the protective member 15 associated with the electronic device 12 and a liquid triboelectrical generator 32 includes multiple electrostatic energy generators, for example, electrostatic energy generators 34, 36, 38, 40, 42 coupled to electrical circuitry (not shown) and separated by physical separators 44, 46, 48, 50. As will be discussed in further detail hereinbelow, the capacitors utilized in the electrostatic energy generators 34, 36, 38, 40, 42 may be supercapacitors or variable capacitors. The liquid triboelectrical generator 32 utilizes the triboelectric effect in generating an electric charge which may recharge the battery 14, for example, associated with the electronic device 12. It should be understood that if the battery charger 10 is implemented in a protective case assemblage then the battery 14 is recharged by way of the power connection member 28 associated with the protective case 24.

The triboelectric effect is known as a transfer of charge between two contacting materials, which become electrically charged in opposite signs. Though the triboelectric effect is known for many centuries, its fundamental mechanism is still under investigation. Only recently was it applied in energy harvesting for fabrication of triboelectric generators converting small-scale mechanical energy into electricity that paves the way for simple and low-cost green-energy technology. However, most of the proposed triboelectric generators are limited in efficiency by indispensable requirement for constant change of cavity volume and/or utilization of sliding surfaces. Also these work best only under dry conditions. However, triboelectricity is known to exist when liquids flow through insulators. For example, a voltage variation of 0.3 V was observed upon water flow through a one meter-long millimeter-diameter rubber pipe and surface charge density of over 5 μC/m2 was measured on each water droplet dispensed from a Teflon-coated pipette tip.

The present battery charger 10 may include a design of a liquid triboelectric generator comprising a liquid-filled capacitor or supercapacitor as the key element enabling the increase of the efficiency of generation of electricity. The proposed approach is based on the relation between the electrical charge Q and voltage V and capacitance C:

$$Q = CV \qquad \text{[Equation (1)]}$$

Therefore the generated electrical current I (which is the time derivative of the triboelectrical charge) appears to be proportional to the capacitance and its variation in time:

$$I = \frac{dQ}{dt} = C\frac{\partial V}{\partial t} + V\frac{\partial C}{\partial t} \qquad \text{[Equation (2)]}$$

where d/dt and ∂/∂t represent total and partial derivative with time correspondingly.

With a supercapacitor which is not fully filled with liquid and separated into more than one individually contacted segments, flow of liquid inside the cavity or series of enclosed chambers causes generation of the triboelectric charge. Therefore the first term in Equation (2) is the variation of the potential across the opposite electrodes owing to the triboelectrically-generated charges, while the second term is the variation of the capacitance due to the local change of capacitance in the segments of the supercapacitor due to the flow of liquid. From Equation (2) one can see that utilization of such triboelectricity-enabled supercapacitor makes it possible to increase the efficiency of triboelectrical generation by a factor of the ratio of electrical capacitance C of the supercapacitor to that of the conventional triboelectrical generator, which can be many orders of magnitude. Supercapacitors are known to feature extremely high capacitance, up to a few kilofarads.

The triboelectricity-enabled, liquid-filled capacitor or supercapacitor may feature the internal volume (cavity) which is only partially filled with liquid, thus enabling for the movement of the liquid inside the cavity. The triboelectricity-enabled supercapacitor also features two or more individually contacted segments that enable the outflow of the electrical charge, which is triboelectrically-generated by the movement of the liquid inside the cavity.

Figure 4:
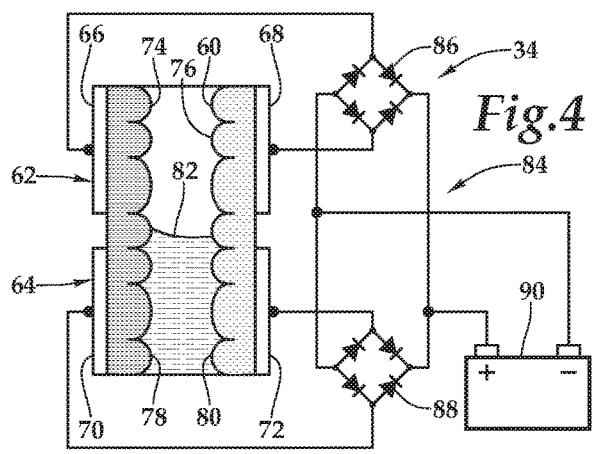
FIG. 4 is a side elevation, in cross section, of one embodiment of an electrostatic energy generator, which forms a portion of the battery charger of FIG. 3, in further detail.

Referring now to FIG. 4, one embodiment of the electrostatic energy generator 34 is depicted in further detail. As discussed, the battery charger housing 30 forms a portion of the protective member 15 of the electronic device 12. The battery charger housing 30 includes an enclosed chamber 60. A pair of variable capacitors 62, 64 which may be supercapacitors or variable capacitors, are located within the battery charger housing 30 and each of the pair of capacitors 62, 64 includes opposing spaced plates 66, 68, 70, 72 which act as electrodes, having respective contact segments 74, 76, 78, 80 thereon. As shown, in one embodiment, the contact segments 74, 76, 78, 80 form at least a portion of the enclosed chamber 60.

An output power increasing, electrically resistive fluid 82 is held within the enclosed chamber 60 and the output power increasing, electrically resistive fluid 82 partially fills the enclosed chamber 60 such that fluid motion varies the fluid-contact segment contact within the enclosed chamber. As will be discussed in further detail hereinbelow, in response to movement of the electronic device 12, induced relative motion between the output power increasing, electrically resistive fluid 82 and contact segments 74, 76, 78, 80 varies the fluid-contact segment contact within the enclosed chamber 60, thereby inversely alternating the capacitance between the pair of capacitors 62, 64 and triboelectrically generating an electrical charge.

An electronic circuit 84 is coupled to the opposing spaced plates 66, 68, 70, 72 of the pair of variable capacitors. In one embodiment, the electronic circuit 84 may include diode bridges 86, 88 and an electrical accumulator 90. The electronic circuit 84 may be configured to transfer the electrical charge to the battery 14 associated with the electronic device 12. In one event, the electrical accumulator 90 may be at least partially integrated with the battery 14.

Figure 5:
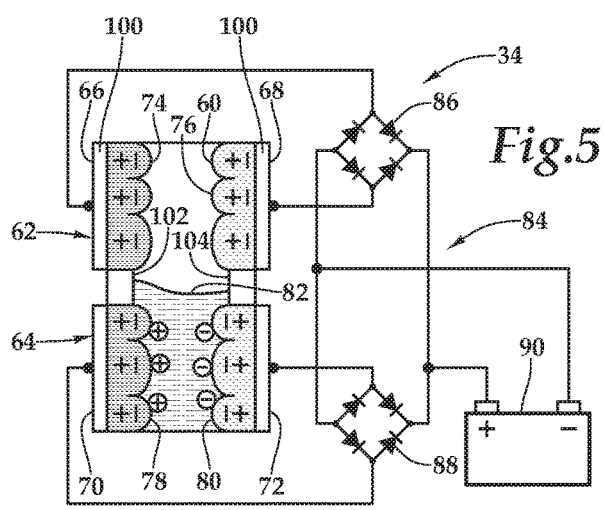
FIG. 5 is a side elevation, in cross section, of another embodiment of the electrostatic energy generator, which forms a portion of the battery charger.

Referring now to FIG. 5, another embodiment of the electrostatic energy generator 34 is depicted. In this embodiment, the plates 66, 68, 70, 72 feature an electret material 100. Electret is a dielectric with a quasi-permanent electric charge or dipole polarization and therefore generates internal and external electric fields. Therefore, utilization of the electret material facilitates generation of the electrical double-layers on the liquid-plate interface (which are crucial for high capacitance of the supercapacitors) without a voltage applied to the electrodes of the triboelectricity-enabled capacitor. Additionally, as shown, the enclosed chamber 60 may include a dielectric material 102, 104 interposed within the contact segments 74, 76, 78, 80 between the opposing spaced plates 66, 68, 70, 72.

Figure 6:
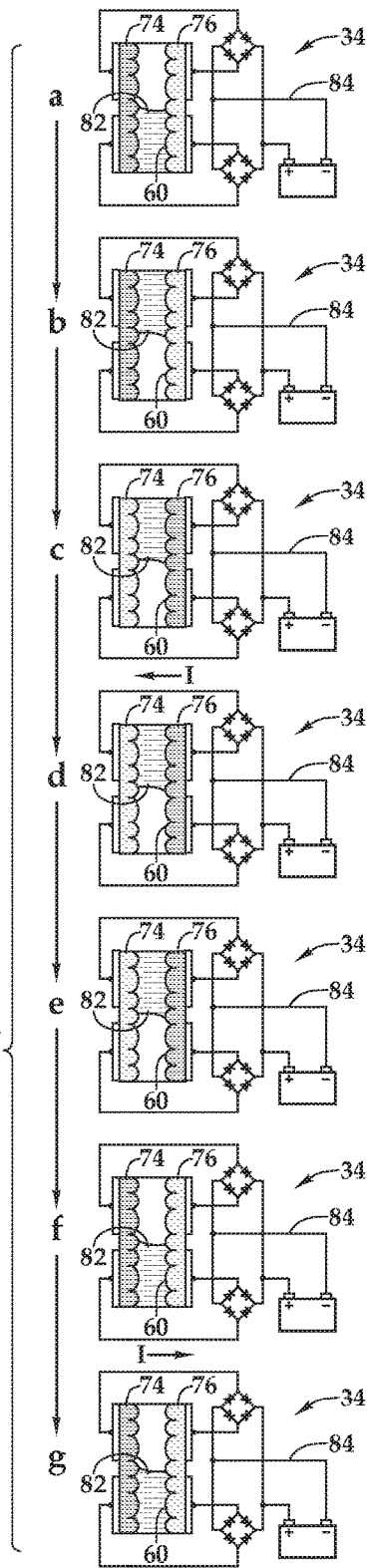
FIG. 6 is a process state diagram depicting one embodiment of the electrical energy generation process.

Referring now to FIG. 6, a process state diagram depicting one embodiment of the electrical energy generation process is shown. In general, in a fluid inflow cycle, movement of the output power increasing, electrically resistive fluid 82 occurs proximate to the opposing spaced plates 66, 68 such that the fluid 82 is physically occupying the enclosed chamber 60. The fluid 82 inflow cycle causes electrostatic charges with opposite signs to be triboelectrically generated and distributed proximate the opposing spaced plates 66, 68. A temporary electrical circuit is created across the opposing spaced plates 66, 68 thereby generating a voltage/current peak. Thereafter, in a fluid outflow cycle, wherein movement of the output power increasing, electrically resistive fluid 82 moves away from the opposing spaced plates 66, 68 and physically evacuating that portion of the enclosed chamber 60, neutralization of the electrostatic charges occurs. Electrons flow to the electronic circuit 84 until equilibrium is reached between the opposing spaced plates 66, 68.

More specifically, at State (a), which may be the initial state of the triboelectricity-enabled liquid-filled capacitor or supercapacitor, the enclosed chamber 60, which is not fully filled with the output power increasing, electrically resistive fluid 82, includes a pair of capacitors 62, 64 each including the opposing spaced plates 66, 68, 70, 72 having the contact segments thereon. For purposes of illustration, it should be appreciated that with respect to FIG. 6, the process of the triboelectrical generation is described for the contact segments 74, 76 proximate the spaced plates 66, 68. It should be further appreciated that a similar description and process applies to the contact segments 78, 80 proximate the spaced plates 70, 72 as well.

At State (b), with respect to the fluid inflow cycle, with the movement of the fluid 82 inside the enclosed chamber 60, electrostatic charges with opposite signs are triboelectrically generated and distributed on the two internal surfaces of the plates 66, 68 of the supercapacitor segment represented by the opposing spaced plates 66, 68. At State (c), the neutral metal electrodes associated with the spaced plates 66, 68 are charged via the triboelectric effect. At State (d), continuing the fluid inflow cycle, electrons flow across the electrical circuit 84 generating a voltage/current peak. At State (e), a temporary potential equilibrium forms in the supercapacitor segment. Beginning the fluid outflow cycle, at State (f), most of the electrostatic charges on the internal surfaces are neutralized during the fluid outflow process prior to, at State (g), electrons flow back via the electrical circuit 84 until the potential equilibrium forms between the two metal electrodes associated with the plates 66, 68. This enables unidirectional flow of the electrical current out of the triboelectrical generator to the electrical circuit 84, including the electrical accumulator 90 and/or battery 14 to be charged.

Figure 7:
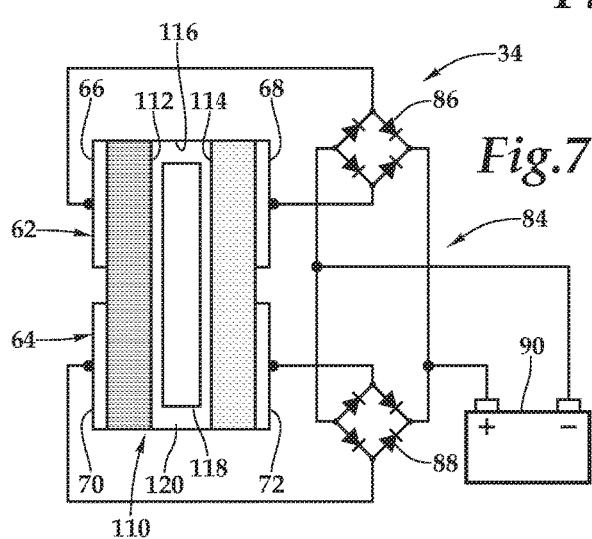
FIG. 7 is a side elevation, in cross section, of a further embodiment of the electrostatic energy generator, which forms a portion of the battery charger.

In another embodiment, depicted in FIG. 7, the battery charger 10 may be a motion-activated charger 110 for electronic devices that includes the battery charger housing 30 having contact members 112, 114 defining an inner chamber 116. A moveable element 118 within the battery charger housing coacts with the contact members 112, 114 of the battery charger housing 30 to generate an electrical charge. This embodiment of the battery charger 10 includes electrical circuitry that is configured to transfer the electrical charge generated to a storage battery. More particularly, in one embodiment, the moveable element 118 may be an output power increasing, electrically resistive object partially filling the enclosed inner chamber 116 such that motion of the moveable element 118 varies the moveable element-contact segment contact within the enclosed inner chamber 116. In response to movement of the electronic device 12, induced relative motion between the output power increasing, electrically resistive moveable element 118 and contact members 112, 114 varies the moveable element-contact segment contact within the enclosed inner chamber, thereby inversely alternating the capacitance between the pair of supercapacitors and triboelectrically generating an electrical charge.

By way of example and not by way of limitation, in the embodiment, the battery charger housing may have dimensions of 82 mm by 110 mm with a 2.20 mm thickness and the inner chamber 116 may have dimensions of 78 mm by 100 mm with a 1.00 mm thickness. It should be appreciated that the shape of the moveable element 118 may vary and, by way of example and not by way of limitation, may include general horizontal shapes or vertical shapes or even irregular shapes. Further, the moveable element 118 may include one or more individual pieces. Therefore, in use, the constant movement of the battery charger housing will create a constant movement of the moveable element that causes friction between the battery charger housing and the moveable element to create the most static electricity possible. It should be further understood that fluid 120 within the inner chamber 116 about the moveable element 118 may include an electrically resistive fluid, such as electrically resistive fluid 82.

In one implementation, the moveable element 118 is disposed within the enclosed inner chamber 116, which may be the enclosed chamber 60, is an output power increasing, electrically resistive object partially filling the enclosed chamber 116 such that motion of the moveable element 118 varies a moveable element-contact segment contact within the enclosed chamber, thereby inversely alternating the capacitance between the pair of supercapacitors and triboelectrically generating an electrical charge. In an instance of this embodiment, each pair of variable capacitors, which may be represented by contact members 112, 114, are configured for an intake cycle wherein movement of the output power increasing, electrically resistive moveable element 118 proximate to the opposing spaced plates and physically occupying enclosed chamber thereto. The intake cycle causes electrostatic charges with opposite signs to be triboelectrically generated and distributed proximate the opposing spaced plates. A temporary electrical circuit created across the opposing spaced plates and generating a voltage/current peak.

Following the output cycle, in an output cycle, movement of the output power increasing, electrically resistive moveable element occurs away from the opposing spaced plates and physically evacuating the enclosed chamber. The fluid outflow cycle causes the neutralization of the electrostatic charges and electrons flow via the electrical circuit to the electronic circuit until equilibrium is reached between the opposing spaced plates.

In a further embodiment, a charging system for electronic device batteries is disclosed that includes the battery charger housing defining an enclosed chamber and a converter contained within the battery charger housing which converts body heat of the user to electrical energy. This embodiment of the battery charger 10 also includes electrical circuitry that is configured to transfer the electrical charge generated to a storage battery. The battery charger housing may include a material causing the generation of additional power from heat. Further, various coatings within the battery charger housing, inner chamber, contact members, or moveable element may enhance performance. By way of example and not by way of limitation, the moveable element 118 discussed in FIG. 7, in one embodiment, additionally captures body heat and coverts the body heat into electrical energy. This is in addition to the electrostatic charging and triboelectrical generator discussed above.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A battery charger for an electronic device, the battery charger comprising:
   a battery charger housing including an enclosed chamber, the enclosed chamber forming a portion of a protective case cover of a protective case such that the electronic device fits therein;
   a pair of capacitors located within the battery charger housing, each of the pair of capacitors including opposing spaced plates having contact segments thereon, the plates including electret;
   the contact segments forming at least a portion of the enclosed chamber;
   an output power increasing, electrically resistive fluid held within the enclosed chamber, the output power increasing, electrically resistive fluid partially filling the enclosed chamber such that fluid motion varies fluid-contact segment contact within the enclosed chamber;
   in response to movement of the electronic device, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge;
   an electronic circuit coupled to the opposing spaced plates of the pair of capacitors, the electronic circuit configured to transfer the electrical charge to a battery associated with the electronic device; and
   a moveable element disposed within the enclosed chamber, the moveable element being an output power increasing, electrically resistive object partially filling the enclosed chamber such that motion of the moveable element varies a moveable element-contact segment contact within the enclosed chamber, thereby inversely alternating the capacitance between the pair of supercapacitors and triboelectrically generating an electrical charge.

2. The battery charger as recited in claim 1, wherein the portable electronic device further comprises a device selected from the group consisting of portable electronic devices, hand controlled devices, and moveable devices.

3. The battery charger as recited in claim 1, wherein the portable electronic device further comprises a device selected from the group consisting of smart phones, tablet computers, smart watches, and cellular telephones.

4. The battery charger as recited in claim 1, further comprising the kinetic motion of the electronic device causing the physical displacement of the output power increase, electrically resistive fluid relative to the pair of capacitors.

5. The battery charger as recited in claim 1, wherein opposing spaced plates further comprise an electret material, the opposing spaced plates generating an internal electric field about the contact segments and an external electric field about the enclosed chamber, thereby enhancing the electrical charge generated through triboelectricity.

6. The battery charger as recited in claim 1, wherein the enclosed chamber further comprises dielectric material interposed within the contact segments between the opposing spaced plates.

7. The battery charger as recited in claim 1, further comprising each pair of variable capacitors being configured for,
- a fluid inflow cycle wherein movement of the output power increasing, electrically resistive fluid proximate to the opposing spaced plates and physically occupying enclosed chamber thereto;
- the fluid inflow cycle causing electrostatic charges with opposite signs to be triboelectrically generated and distributed proximate the opposing spaced plates;
- a temporary electrical circuit created across the opposing spaced plates and generating a voltage/current peak;
- a fluid outflow cycle wherein movement of the output power increasing, electrically resistive fluid away from the opposing spaced plates and physically evacuating the enclosed chamber;
- the fluid outflow cycle causing the neutralization of the electrostatic charges; and
- electrons flow via the electrical circuit to the electronic circuit until equilibrium is reached between the opposing spaced plates.

8. The battery charger as recited in claim 1, further comprising each pair of variable capacitors being configured for,
- an intake cycle wherein movement of the output power increasing, electrically resistive moveable element proximate to the opposing spaced plates and physically occupying enclosed chamber thereto;
- the intake cycle causing electrostatic charges with opposite signs to be triboelectrically generated and distributed proximate the opposing spaced plates;
- a temporary electrical circuit created across the opposing spaced plates and generating a voltage/current peak;
- an output cycle wherein movement of the output power increasing, electrically resistive moveable element away from the opposing spaced plates and physically evacuating the enclosed chamber;
- the fluid outflow cycle causing the neutralization of the electrostatic charges; and
- electrons flow via the electrical circuit to the electronic circuit until equilibrium is reached between the opposing spaced plates.

9. A battery charger for an electronic device, the battery charger comprising:
- a battery charger housing including an enclosed chamber, the battery charger housing being a portion of an outer device shell of the electronic device;
- a pair of capacitors located within the battery charger housing, each of the pair of capacitors including opposing spaced plates having contact segments thereon;
- the contact segments forming at least a portion of the enclosed chamber;
- an output power increasing, electrically resistive fluid held within the enclosed chamber, the output power increasing, electrically resistive fluid partially filling the enclosed chamber such that fluid motion varies fluid-contact segment contact within the enclosed chamber;
- in response to movement of the electronic device, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge;
- an electronic circuit coupled to the opposing spaced plates of the pair of capacitors, the electronic circuit configured to transfer the electrical charge to a battery associated with the electronic device; and
- a moveable element disposed within the enclosed chamber, the moveable element being an output power increasing, electrically resistive object partially filling the enclosed chamber such that motion of the moveable element varies a moveable element-contact segment contact within the enclosed chamber, thereby inversely alternating the capacitance between the pair of supercapacitors and triboelectrically generating an electrical charge.

10. The battery charger as recited in claim 9, wherein the portable electronic device further comprises a device selected from the group consisting of portable electronic devices, hand controlled devices, and moveable devices.

11. The battery charger as recited in claim 9, wherein the portable electronic device further comprises a device selected from the group consisting of smart phones, tablet computers, smart watches, and cellular telephones.

12. The battery charger as recited in claim 9, further comprising the kinetic motion of the electronic device causing the physical displacement of the output power increase, electrically resistive fluid relative to the pair of capacitors.

13. The battery charger as recited in claim 9, wherein opposing spaced plates further comprise an electret material, the opposing spaced plates generating an internal electric field about the contact segments and an external electric field about the enclosed chamber, thereby enhancing the electrical charge generated through triboelectricity.

14. The battery charger as recited in claim 9, wherein the enclosed chamber further comprises dielectric material interposed within the contact segments between the opposing spaced plates.

15. The battery charger as recited in claim 9, further comprising each pair of variable capacitors being configured for,
- a fluid inflow cycle wherein movement of the output power increasing, electrically resistive fluid proximate to the opposing spaced plates and physically occupying enclosed chamber thereto;
- the fluid inflow cycle causing electrostatic charges with opposite signs to be triboelectrically generated and distributed proximate the opposing spaced plates;
- a temporary electrical circuit created across the opposing spaced plates and generating a voltage/current peak;
- a fluid outflow cycle wherein movement of the output power increasing, electrically resistive fluid away from the opposing spaced plates and physically evacuating the enclosed chamber;
- the fluid outflow cycle causing the neutralization of the electrostatic charges; and
- electrons flow via the electrical circuit to the electronic circuit until equilibrium is reached between the opposing spaced plates.

16. The battery charger as recited in claim 9, further comprising each pair of variable capacitors being configured for,
- an intake cycle wherein movement of the output power increasing, electrically resistive moveable element proximate to the opposing spaced plates and physically occupying enclosed chamber thereto;

the intake cycle causing electrostatic charges with opposite signs to be triboelectrically generated and distributed proximate the opposing spaced plates;

a temporary electrical circuit created across the opposing spaced plates and generating a voltage/current peak;

an output cycle wherein movement of the output power increasing, electrically resistive moveable element away from the opposing spaced plates and physically evacuating the enclosed chamber;

the fluid outflow cycle causing the neutralization of the electrostatic charges; and electrons flow via the electrical circuit to the electronic circuit until equilibrium is reached between the opposing spaced plates.

17. A battery charger for an electronic device, the battery charger comprising:

a battery charger housing including an enclosed chamber, the enclosed chamber forming a portion of a protective case cover of a protective case such that the electronic device fits therein;

a pair of capacitors located within the battery charger housing, each of the pair of capacitors including opposing spaced plates having contact segments thereon, the plates including electret;

the opposing spaced plates including an electret material, the opposing spaced plates generating an internal electric field about the contact segments and an external electric field about the enclosed chamber, thereby enhancing the electrical charge generated through triboelectricity;

the contact segments forming at least a portion of the enclosed chamber;

an output power increasing, electrically resistive fluid held within the enclosed chamber, the output power increasing, electrically resistive fluid partially filling the enclosed chamber such that fluid motion varies fluid-contact segment contact within the enclosed chamber;

in response to movement of the electronic device, induced relative motion between the output power increasing, electrically resistive fluid and contact segments varies the fluid-contact segment contact within the enclosed chamber, thereby inversely alternating the capacitance between the pair of capacitors and triboelectrically generating an electrical charge;

an electronic circuit coupled to the opposing spaced plates of the pair of capacitors, the electronic circuit configured to transfer the electrical charge to a battery associated with the electronic device; and the kinetic motion of the electronic device causing the physical displacement of the output power increase, electrically resistive fluid relative to the pair of capacitors.

18. The battery charger as recited in claim 8, further comprising each pair of variable capacitors being configured for, a fluid inflow cycle wherein movement of the output power increasing, electrically resistive fluid proximate to the opposing spaced plates and physically occupying enclosed chamber thereto;

the fluid inflow cycle causing electrostatic charges with opposite signs to be triboelectrically generated and distributed proximate the opposing spaced plates;

a temporary electrical circuit created across the opposing spaced plates and generating a voltage/current peak;

a fluid outflow cycle wherein movement of the output power increasing, electrically resistive fluid away from the opposing spaced plates and physically evacuating the enclosed chamber;

the fluid outflow cycle causing the neutralization of the electrostatic charges; and electrons flow via the electrical circuit to the electronic circuit until equilibrium is reached between the opposing spaced plates.

* * * * *